Sept. 20, 1955 A. J. ROCHOW 2,718,336
CONDIMENT DISPENSER
Filed Feb. 24, 1950

INVENTOR.
ARTHUR J. ROCHOW
BY
Edward L. Cumpston
HIS ATTORNEY

United States Patent Office 2,718,336
Patented Sept. 20, 1955

2,718,336

CONDIMENT DISPENSER

Arthur J. Rochow, Brighton, N. Y.

Application February 24, 1950, Serial No. 146,093

6 Claims. (Cl. 222—142.9)

This invention relates to condiment dispensers, and more particularly, to the variety adapted to contain and dispense a plurality of condiments, flavoring ingredients, and the like, one object being to provide an improved device of this character having a more simple, practical and economical construction.

Another object is to provide a combination condiment dispenser having inner and outer cover plates one of which is formed with sifting perforations and both of which are adapted to be resiliently held in place without the use of screws, bolts, and the like.

Another object is to provide a combination condiment dispenser having the above advantages in which the supply of one of the condiments contained therein may be dispensed without sifting.

Another object is to provide a condiment dispenser of the above character that may be easily disassembled for cleaning, filling and the like.

Still a further object is to provide a combination condiment dispenser that may be easily and economically manufactured and assembled.

To these and other ends the invention resides in certain improvements and combinations of parts, all as will be hereinafter more fully described, the novel features being pointed out in the claims at the end of the specification.

Figure 1:
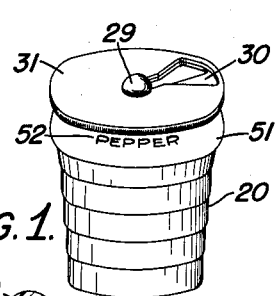
Fig. 1 is a perspective view of an assembled condiment dispenser embodying the present invention.
Figure 2:
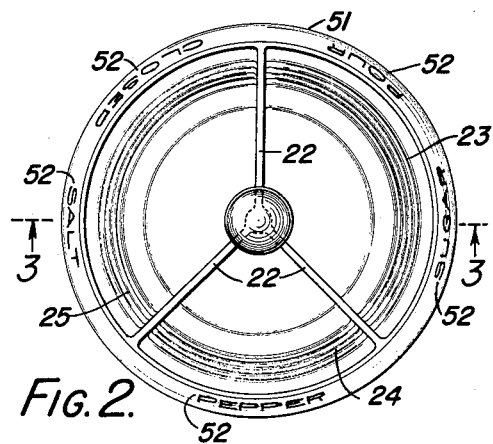
Fig. 2 is a top plan view of the same with the inner and outer cover plates removed, and showing the separating partitions and retaining head.
Figure 3:
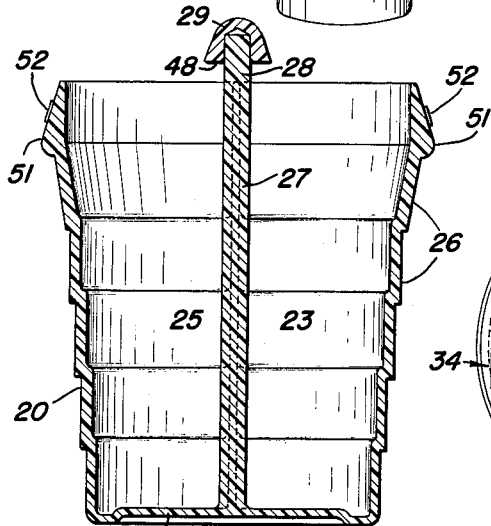
Fig. 3 is a vertical sectional view taken substantially on line 3—3 in Fig. 2.

The preferred embodiment of the invention comprises a cylindrical container 20 having an open top, an integrally formed bottom member 21 and radially extending partition walls 22 which divide the container into three compartments 23, 24 and 25 as shown in Figs. 1, 2 and 3. Said container is preferably molded from a moldable plastic material such as a styrene compound. The side walls of container 20 are formed with a series of steps 26 increasing in diameter towards the open upper end of said container. Said steps afford an attractive appearance and provide a convenient means for grasping said container, thereby reducing chances of the container slipping from the grip. Partitions 22 have their junction in a post 27 concentric with the longitudinal axis of said container and extending upwardly beyond the top of said partitions where it is provided with a substantially circular upper end or boss 28 to which is cemented a substantially hemispherical head 29, the purposes of which will be explained later.

Figure 4:
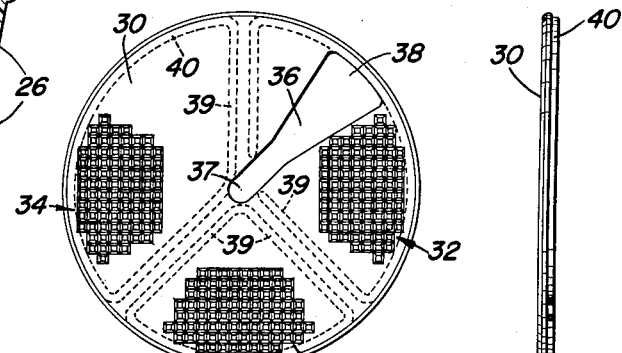
Fig. 4 is a top plan view of the inner cover plate.
Figure 5:
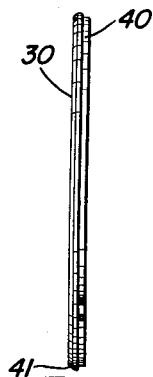
Fig. 5 is an edgewise view of the inner cover plate.
Figure 6:
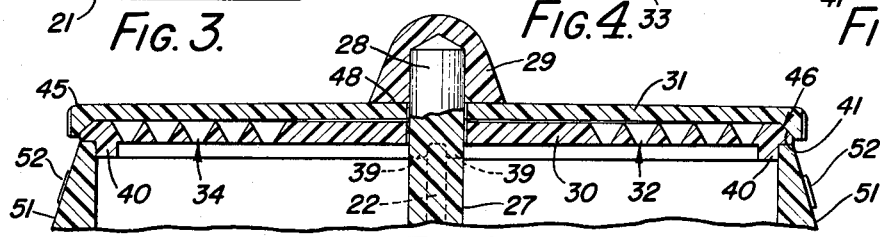
Fig. 6 is an enlarged fragmentary sectional view of the top of the condiment dispenser showing the inner and outer cover plates assembled in position.
Figures 7, 8:
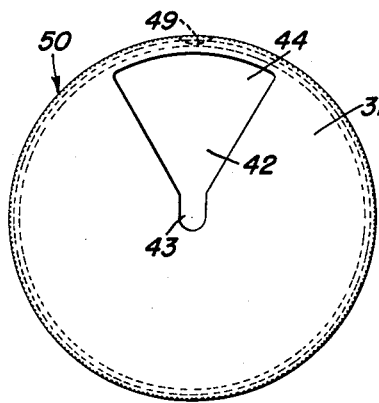
Fig. 7 is a top plan view of the outer cover plate.
Fig. 8 is an edge view of the outer cover plate partly in section and partly broken away.
Figure 9:
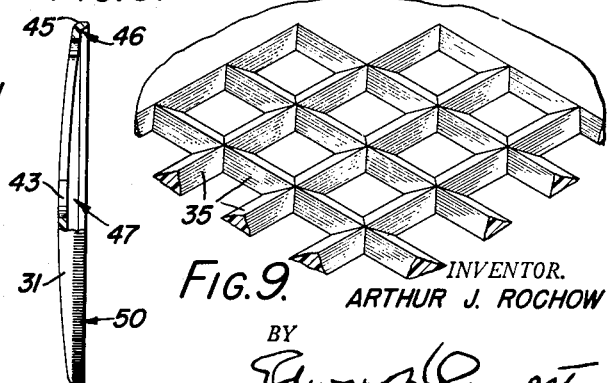
Fig. 9 is an enlarged fragmentary perspective view of a portion of the inner cover plate showing one of the groups of perforations.

The means for closing the open end of said container comprise inner and outer cover plates 30 and 31, respectively (Figs. 4, 5 and 8). Said inner cover or sifter plate 30, which is preferably molded of a plastic material such as a styrene compound, has formed therein three groups of perforations shown generally at 32, 33 and 34 which are adapted to be positioned over compartments 23, 24 and 25, respectively. Although the perforations in each group are identical in structure, said perforations may vary in size and number per group, depending on the properties of the condiment to be sifted. These perforations preferably have chamfered edges 35 as shown in detail in Fig. 9 to facilitate the sifting of the condiments without clogging in the perforations. The inner cover has formed therein an outwardly flaring opening 36 which at the inner end 37 thereof is slightly larger in width than the diameter of post 28. This opening extends outwardly nearly to the periphery of cover plate 30 and at the outer end 38 thereof is somewhat wider than the diameter of head 29 so that the cover plate may be lowered over head 29 and placed in position as shown in Fig. 6. Cover plate 30 has formed on the underside thereof a series of ribs 39 which form parallel walled grooves adapted to closely engage the upper edges of said partition walls. Near the periphery of cover plate 30, ribs 39 are joined to a depending flange 40 which is adapted to fit into the open top of container 20 and to be positioned adjacent to the upper curved edges of the respective compartments. Thus, when cover plate 30 is fitted into position on the top of the container, it is held against angular displacement, thereby insuring a correct positioning of the groups of perforations. The upper peripheral corner of cover plate 30 is bevelled at 41 to aid in yieldably holding the outer cover plate 31 in position.

Outer cover or selector plate 31, slightly larger in diameter than sifter plate 30 is adapted to fit over said sifter plate as shown in Fig. 6. Plate 31 has formed therein an outwardly flaring opening 42 which at the inner portion 43 thereof is adapted to closely fit post 28. Opening 42 is formed with an outer portion 44 which is considerably wider than the inner portion 43 thereof as shown in Figs. 1 and 7. Opening 42 is sufficient in area so that when said opening is superimposed over a desired group of perforations in sifter plate 30, said opening will uncover a sufficient number of said perforations. As cover plate 31 is adapted to spring under head 29, opening 42 must in any instance be large enough to pass over said head 29.

The periphery of plate 31 is formed with a depending flange 45 having a flared or bevelled inner circumference 46 adapted to fit over the upper bevelled peripheral corner 41 of cover plate 30 as shown in Fig. 6. Cover plate 31, preferably molded of a resilient plastic material, such as a styrene compound, is cambered or dished upwardly as shown generally at 47 in Fig. 8. Thus, when the condiment holder is assembled, plate 31 is flattened out and forced between the lower edge 48 of head 29 and the upper surface of inner cover plate 30. This flattening sets up stresses within cover plate 31 which act upwardly near the center thereof and force it upwardly against head 29. These same stresses force the periphery of said plate downwardly and thus bevelled edge 46 is brought into firm contact with bevelled corner 41 on the inner cover plate. The effect of the above stresses in conjunction with bevelled edges 41 and 45 is to cause the outer cover plate 31 to be yieldably held in place through the respective openings in said inner and outer cover plates adjacent the inner ends of said openings, and a head on the end of said boss engaging said outer cover plate for releasably holding said inner and outer cover plates in position.

5. A combination condiment dispenser comprising a container open at one end thereof, partitions formed integrally with said container for dividing the same into compartments, said partitions integrally forming at the junction thereof a boss extending beyond the open end of said container, an inner cover plate adapted to close the open end of said container and having therein a plurality of groups of perforations, there being one group for each of said compartments, said inner cover plate having therein also an opening adjacent the center thereof, an outer cover plate having an opening therein extending substantially from the periphery of said outer cover plate inwardly beyond the center thereof, said boss extending through the opening in said inner cover plate and through the opening in said outer cover plate adjacent the inner end thereof and a head on the end of said boss engaging said outer cover plate for releasably holding said inner and outer cover plates in position, said outer cover plate being dished upwardly for releasably pressing against said head, said outer cover plate being adapted to rotate over said inner cover plate for uncovering a desired group of perforations and simultaneously closing off the remaining groups of perforations in said inner cover plate.

6. A combination condiment dispenser comprising a container open at one end thereof, integrally formed partitions in said container for dividing the same into compartments, said partitions integrally forming at the junction thereof a boss extending beyond the open end of said container, an inner cover plate closing the open end of said container and having therein a plurality of groups of perforations, there being one group for each of said compartments, said inner cover plate having therein also an opening extending substantially from the periphery of said plate inwardly beyond the center thereof, an outer cover plate having a knurled periphery and an opening therein extending substantially from the periphery of said outer cover plate inwardly beyond the center thereof, said boss extending through the respective openings in said inner and outer cover plates adjacent the inner ends of said openings, and a head on the end of said boss engaging said outer cover plate for releasably holding said inner and outer cover plates in position, said outer cover plate having a depending peripheral flange and being dished upwardly for releasably pressing against said head for holding said peripheral flange and said outer cover plate concentric with said inner cover plate, and said outer cover plate being adapted to rotate over said inner cover plate for selectively uncovering a desired group of perforations and simultaneously closing off the remaining groups of perforations in said inner cover plate.

References Cited in the file of this patent

UNITED STATES PATENTS

| | | |
|---|---|---|
| 160,631 | Wheeler | Mar. 9, 1875 |
| 1,267,564 | Livingston | May 28, 1918 |
| 1,273,779 | Harris | July 23, 1918 |
| 2,302,186 | Caretto | Nov. 17, 1942 |
| 2,469,034 | Garris | May 3, 1949 |
| 2,526,308 | Vorsanger | Oct. 17, 1950 |